US010252924B2

(12) United States Patent
Kim et al.

(10) Patent No.: US 10,252,924 B2
(45) Date of Patent: *Apr. 9, 2019

(54) PURIFICATION OF ULTRA-HIGH SALINE AND CONTAMINATED WATER BY MULTI-STAGE ION CONCENTRATION POLARIZATION (ICP) DESALINATION

(71) Applicant: Massachusetts Institute of Technology, Cambridge, MA (US)

(72) Inventors: Bumjoo Kim, Malden, MA (US); Jongyoon Han, Bedford, MA (US); Rhokyun Kwak, Seoul (KR); Bader Shafaqa Al-Anzi, Safat (KW)

(73) Assignee: Massachusetts Institute of Technology, Cambridge, MA (US)

( * ) Notice: Subject to any disclaimer, the term of this patent is extended or adjusted under 35 U.S.C. 154(b) by 621 days.

This patent is subject to a terminal disclaimer.

(21) Appl. No.: 14/920,992

(22) Filed: Oct. 23, 2015

(65) Prior Publication Data

US 2016/0115045 A1    Apr. 28, 2016

Related U.S. Application Data

(60) Provisional application No. 62/067,501, filed on Oct. 23, 2014.

(51) Int. Cl.
*C02F 1/469*    (2006.01)
*C02F 1/46*    (2006.01)
(Continued)

(52) U.S. Cl.
CPC ............ *C02F 1/4695* (2013.01); *B01D 61/42* (2013.01); *C02F 1/4604* (2013.01); *C02F 1/469* (2013.01); *C02F 1/4698* (2013.01); *C02F 2101/10* (2013.01); *C02F 2101/30* (2013.01); *C02F 2101/32* (2013.01); *C02F 2103/08* (2013.01); *C02F 2201/46115* (2013.01); *C02F 2301/04* (2013.01); *C02F 2301/08* (2013.01)

(58) Field of Classification Search
CPC ...................................... C02F 1/469
See application file for complete search history.

(56) References Cited

U.S. PATENT DOCUMENTS 9,643,864 B2 * 5/2017 Verschueren ........... C02F 1/006
2006/0042948 A1 * 3/2006 Santiago .......... G01N 27/44791
204/450
(Continued)

FOREIGN PATENT DOCUMENTS

EP    2420478 A1    2/2012
WO    2010011760 A1    1/2010

*Primary Examiner* — Salil Jain
(74) *Attorney, Agent, or Firm* — Elmore Patent Law Group, P.C.; Carolyn Elmore

(57) ABSTRACT

A water stream is passed between two juxtaposed similar ion exchange membranes (AEMs or CEMs), forming an ion depletion and ion enrichment zones when an electric field is applied. As cations are selectively transferred through the CEMs, for example, anions are relocated in order to achieve electro-neutrality, resulting in the concentration drop (increase) in ion depletion (enrichment) zone. Trifurcation of the output channel allows collection of concentrated, dilute and intermediate streams, with the intermediate stream serving as input to the next stage of a serialized implementation.

11 Claims, 16 Drawing Sheets

(51) Int. Cl.
    *B01D 61/42*     (2006.01)
    *C02F 103/08*     (2006.01)
    *C02F 101/10*     (2006.01)
    *C02F 101/30*     (2006.01)
    *C02F 101/32*     (2006.01)

(56) References Cited

U.S. PATENT DOCUMENTS

| | | | |
|---|---|---|---|
| 2011/0198225 A1* | 8/2011 | Kim | B01D 57/02 |
| | | | 204/452 |
| 2011/0308953 A1* | 12/2011 | Bazant | B01D 61/425 |
| | | | 204/520 |
| 2014/0374274 A1 | 12/2014 | Kwak et al. | |

* cited by examiner

PURIFICATION OF ULTRA-HIGH SALINE AND CONTAMINATED WATER BY MULTI-STAGE ION CONCENTRATION POLARIZATION (ICP) DESALINATION

RELATED APPLICATIONS

This application claims the benefit of U.S. Provisional Application 62/067,501, filed Oct. 23, 2014. The entire teaching of the above application is incorporated herein by reference.

GOVERNMENT SUPPORT

This invention was made with Government support under Grant No. DE-AR0000294 awarded by the Department of Energy. The Government has certain rights in the invention.

BACKGROUND OF THE INVENTION

As water resources are rapidly being polluted, significant attention is now being paid to recovery of these waters through desalination and/or purification. In particular, with the adoption of horizontal drilling and hydraulic fracturing techniques to unlock the extensive natural energy resources from shale formations, issues regarding contaminated water from shale development are coming to the fore. Increasing development of shale gas sources has brought up an environmental issue concerning proper treatment of the often highly contaminated flowback or produced water. This produced water commonly contains various suspended solids as well as relatively large amounts of salts, often 1-5 times higher than seawater. Currently available technologies for desalination and treatment of produced water (e.g., thermal evaporation and reverse osmosis) are expensive because of multiple pretreatment steps necessary to remove suspended solids such as oil and organics, significant energy requirements for desalting, and the cost of equipment. In addition to produced water from shale development, a demand for economical purification of contaminated ground water is increasing globally.

In related applications [1], we presented the concept of ICP desalination such that each concentrate and dilute stream generated between two identical Ion Exchange Membranes (IEMs) can be separately acquired. Comparatively, conventional electrodialysis (ED) utilizes both Cation Exchange Membrane (CEM) and Anion Exchange Membrane (AEM) as shown in FIG. 1. Since different ionic diffusivity causes different thicknesses of ICP (ion depletion and enrichment) zone near the membrane, desalination performance could change depending on the kinds of major ion present in the source water and the installed membrane (CEM or AEM). Based on our analysis, CEMs in NaCl (Sodium Chloride) show better salt removal and current utilization/energy efficiency than electrodialysis (ED) [2] driving us to move towards developing ICP desalination for energy-efficient technology.

With the global market for water desalination/purification showing considerable growth and comprising variously segmented target sources, significant commercial opportunities exist for cost-effective water desalination and purification processes. The operational advantages of effectively and efficiently dealing with ultra-saline water coupled with the ability to simultaneously remove suspended solids could drive ICP to emerge as the preferred technology in the shale development industry. Although Reverse Osmosis (RO) is economical and dominant in the non-thermal desalination market, it is not economically viable for treating ultra-saline water (>40,000 ppm total dissolved solids, TDS). Thus, the shale development industry typically employs energy-intensive thermal desalination. [8]

Solutions for addressing these needs call for:
a) Adaptable technologies for desalination of waters comprising a wide range of salinities, such as brackish water, seawater and produced water.
b) Technologies and methods which permit en bloc desalination/purification of contaminated waters; i.e., technologies that demonstrate simultaneous elimination of a range of suspended solids such as red blood cells, crude oil-in-water emulsion, and salts.
c) Cost-effective multi-stage strategies which leverage and improve technologies such as Ion Concentration Polarization (ICP).

SUMMARY OF THE INVENTION

The following are improvements of inventions described in U.S. application Ser. No. 14/857,133 filed on Sep. 17, 2015 which is incorporated herein by reference.

ICP technology can be economically developed for purification of produced water through trifurcated or bifurcated strategies comprising serial extraction of concentrate streams. These methods are advantageous to high salinity waters, offering significant cost reduction over existing technologies for pre and post treatment (e.g. elimination of suspended solids).

Based on the results described below, ICP desalination could be directly applicable to wide salinity range from Brackish water (<TDS 10,000 ppm) to produced water (>TDS 30,000 ppm) by single stage operation. However, in order to achieve output water with high purity by simple single stage ICP, it would require both extensive membrane area and exorbitant operating electricity. FIG. 5(A) shows a simulation result about current density distribution along the membrane when constant voltage applies between the membranes. According to this analysis, one can clearly find current flux through the membrane decreases along the membrane, thereby meaning most of ionic current flow in the earlier region of the membrane while later region of membrane does not contribute effective salt removal much. Consequently, we need enormous membrane area (but, with poor area efficiency) to remove most of salts in feed solution especially when we treat high saline water. In addition to membrane area efficiency, we have investigated trend of specific energy (EPIR: Energy Per Ion Removal) depending on salt removal ratio. As shown in FIG. 5(B), EPIR is increasing almost linear to the salt removal ratio in single-stage ICP, thereby meaning higher salt removal in single-stage should cause rapid increment of total power consumption. From the results, therefore, we can realize that smaller amount of salt removal with shorter membrane expenditure could save final water cost (summation of capital and operating cost) and it eventually drives us toward the multi-stage ICP operation for economical desalination.

While multi-stage approaches for cost-effective desalination have been used in Reverse Osmosis and Electrodialysis (ED) [5-7], it is important to establish appropriate strategies for multi-staging by fully considering the unique characteristics of ICP desalination. Since dilute and concentrate streams coexist between unit membrane pairs in ICP systems, constant in average concentration along the membrane, each stage in multi-staged ICP should involve extracting out certain streams from the ongoing process and delivering yet another stream to the next stage as feed water.

Therefore, we considered two issues: 1) separation of the output channel to facilitate management of individual output flows; and 2) how the feed concentration changes in every stage corresponding to the separation strategy. Regarding the output channels, since there are three distinct concentration regimes between two identical membranes (CEMs) as shown in FIG. 6(a), bifurcation and trifurcation strategies were considered. Regarding the feed concentration, we investigated the Energy Per Ion Removed (EPIR) trend using feed solutions with a wide range of concentrations. Using Sodium Chloride (NaCl) 0.1M-1.7M, equivalent salinity TDS 6-100K ppm), FIG. 6(B), EPIR rapidly decreases as feed concentration increases up to 0.7M and then remains nearly constant. This result indicates that operating with higher feed salinity is generally a more energy-efficient strategy in ICP desalination.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Desalination and Purification for Seawater/Produced Water

Figure 2A:
FIG. 2A-2B: Fluorescent image of ICP desalination with natural seawater; B) Fluorescent image of ICP desalination with high saline (1.0M NaCl) water.
Figure 2B:
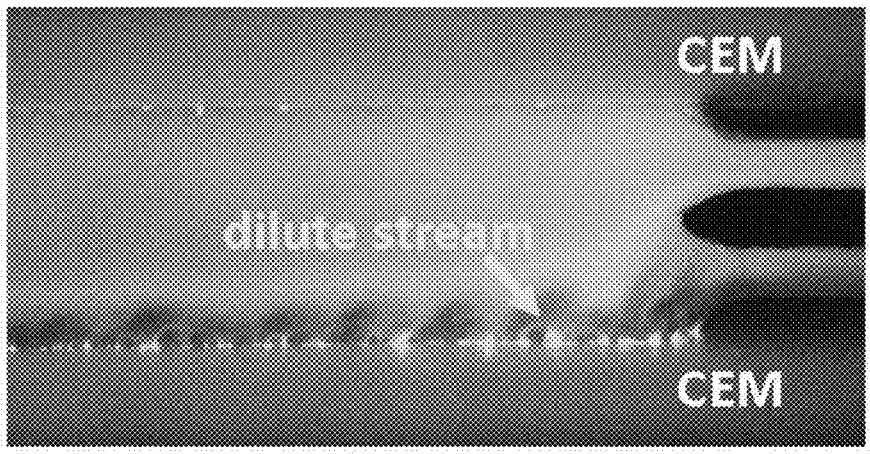

Previously, we demonstrated ICP desalination using brackish (low saline) water. In order to verify the feasibility for highly concentrated water, we have carried out desalination experiments with natural seawater (from Revere Beach, Mass.) and high saline water (NaCl 1.0 M, similar salinity of typical flowback/produced water). FIG. 2A and FIG. 2B are visualizations of ICP desalination operation between two CEMs using natural seawater and high saline water, respectively, enhanced by adding small amounts of fluorescent dye to the feed solution. For monitoring real-time change of salt concentration in the dilute stream, we traced the conductivity value of desalted channel directly by connecting a flow-through conductivity probe (Microelectrode Inc., Bedford, N.H.). As shown in FIGS. 2A and 2B, the dark region, which actually means fluorescent dye-depleted region, approximately represents the ion depletion zone. Note that it covers a majority of the desalted channel. Corresponding to fluorescent images, we could measure final saturated concentration of 0.03M (95% salt removal, FIG. 2A and 0.13M (87% salt removal, FIG. 2B, respectively. Therefore, it is clearly demonstrated that the ICP desalination could be feasible technology for processing highly concentrated water such as seawater and produced water.

Separation of Suspended Solids (Cell/Oil)

Figure 3A:
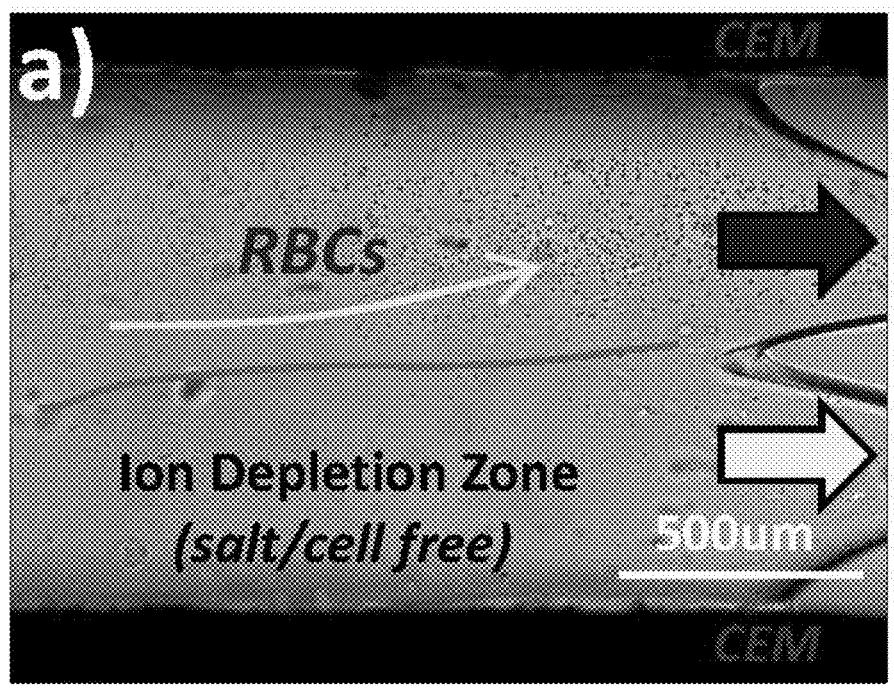
FIG. 3A-3B: Optical image of Red Blood Cell separation; B) Fluorescent image of crude oil-in-water emulsion separation.
Figure 3B:
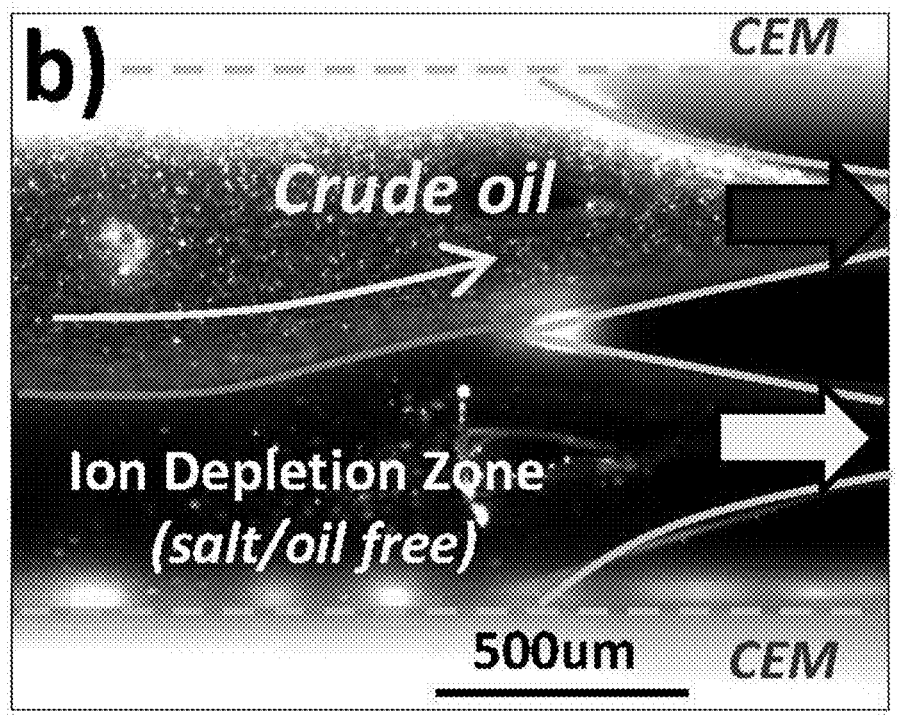

Typical polluted water contains considerable quantities of suspended solids as well as salts. Yet, as most desalination technologies (Reverse Osmosis, Electrodialysis, Membrane Distillation, etc.) mainly utilizing membrane separation suffer from severe membrane fouling, additional pre/post treatments are necessary to remove suspended solids, thereby bearing more cost. However, ICP desalination can tactfully eliminate them from the dilute stream producing real purified water and we have already suggested its possibility showing separation of fluorescent dye and carboxylate microsphere in the previous technology disclosure. This time, we have brought Red Blood Cells (RBCs, organic) and crude oil emulsion (inorganic) in ICP desalination to verify technical practicality of eliminating various suspended solids in contaminated water sources. As shown in FIG. 3, most of RBCs and crude oil were successfully delivered to concentrated stream on top in parallel with salt ions removed through the membrane. It is because of electro migration, which makes negatively charged RBCs/Crude oil emulsion move upward as electric potential decreases. Additionally, electro-convection can also help most particles to be driven out from the dilute stream by generating vortices near the membrane with current. Since many bio-agents (e.g. *Escherichia coli*, *Salmonella*, and *Pseudomonas*, sludge) and colloidal particles are generally negatively charged, [3, 4] ICP desalination would be sufficiently considered as novel water purification technology that can eliminate both salts and suspended solids simultaneously.

Multi-stack Method

Figure 4:
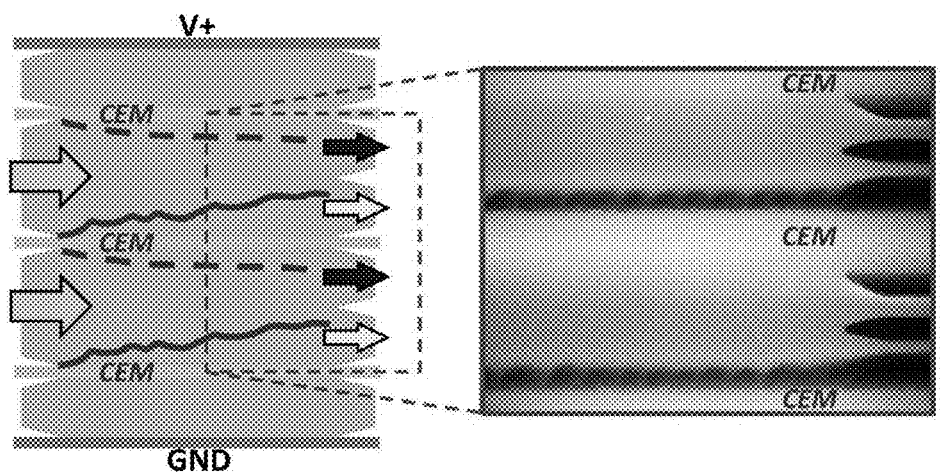
FIG. 4: Schematic illustration and fluorescent image of multi-stack ICP desalination utilizing common current flow.

Given that a voltage drop occurs in the rinsing channels (including electrodes), increased voltage for operating single cell system is desirable. In order to improve power efficiency, one can make a multi-stacked cell system with a single operating unit (one pair of anode/cathode and common current flow) by placing a number of cells in parallel between anode and cathode. FIG. 4 shows a schematic view of a multi-stack ICP and corresponding fluorescent image and we observed every cell stacked between anode and cathode can operate well showing identical desalination performances. Apart from better power efficiency, the multi-cell platform can be useful to increase the throughput as well.

Trifurcated ICP

Figure 5A:
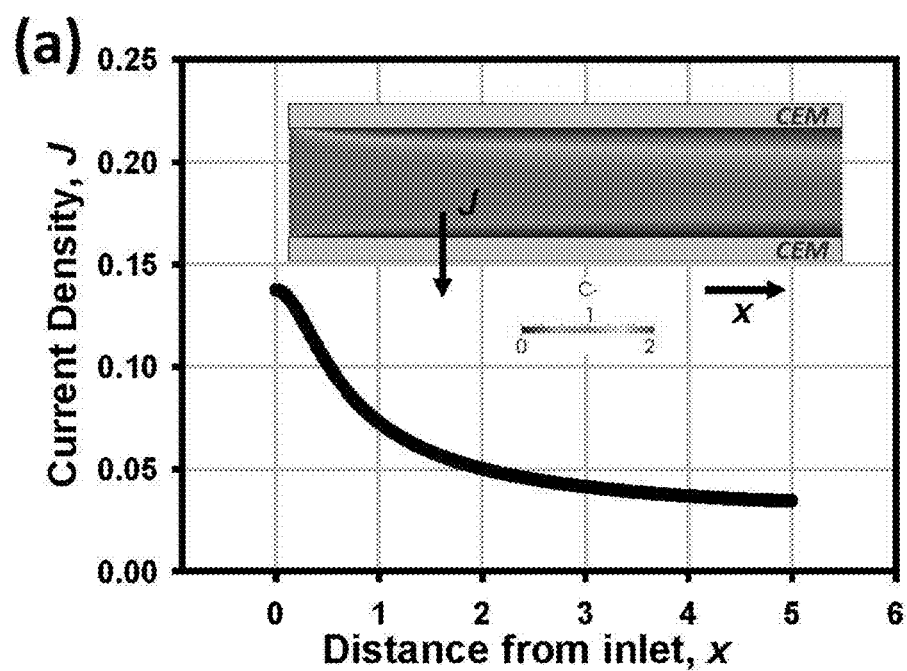
FIG. 5A-5B: Graph depiction of simulation of current density along membrane; B) Graph depiction of experimental results for Energy Per Ion Removal (EPIR).
Figure 5B:
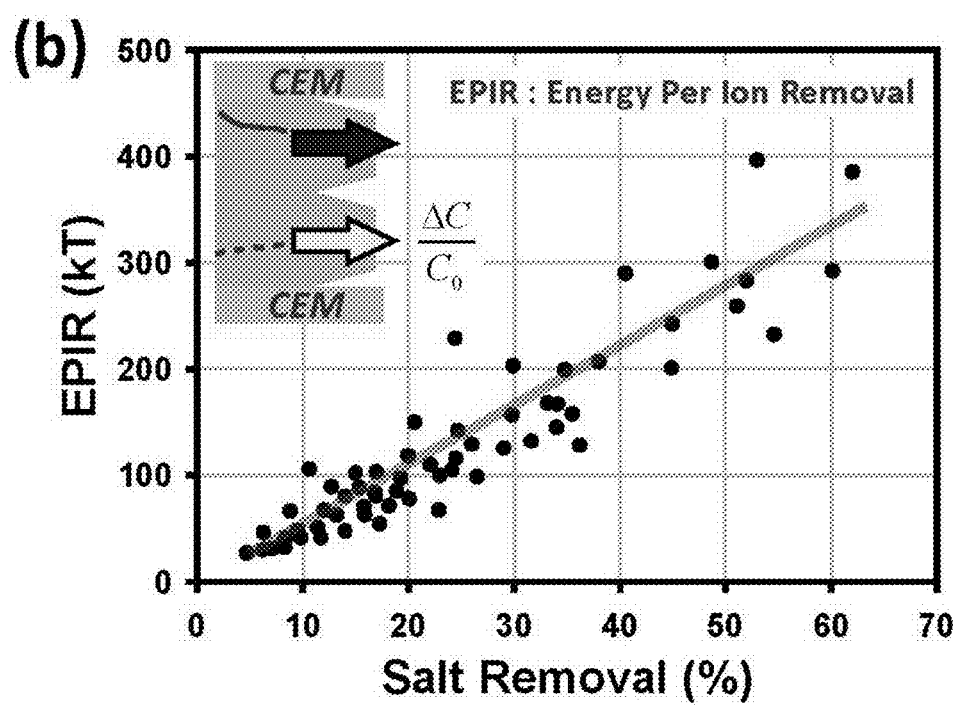
Figure 6A:
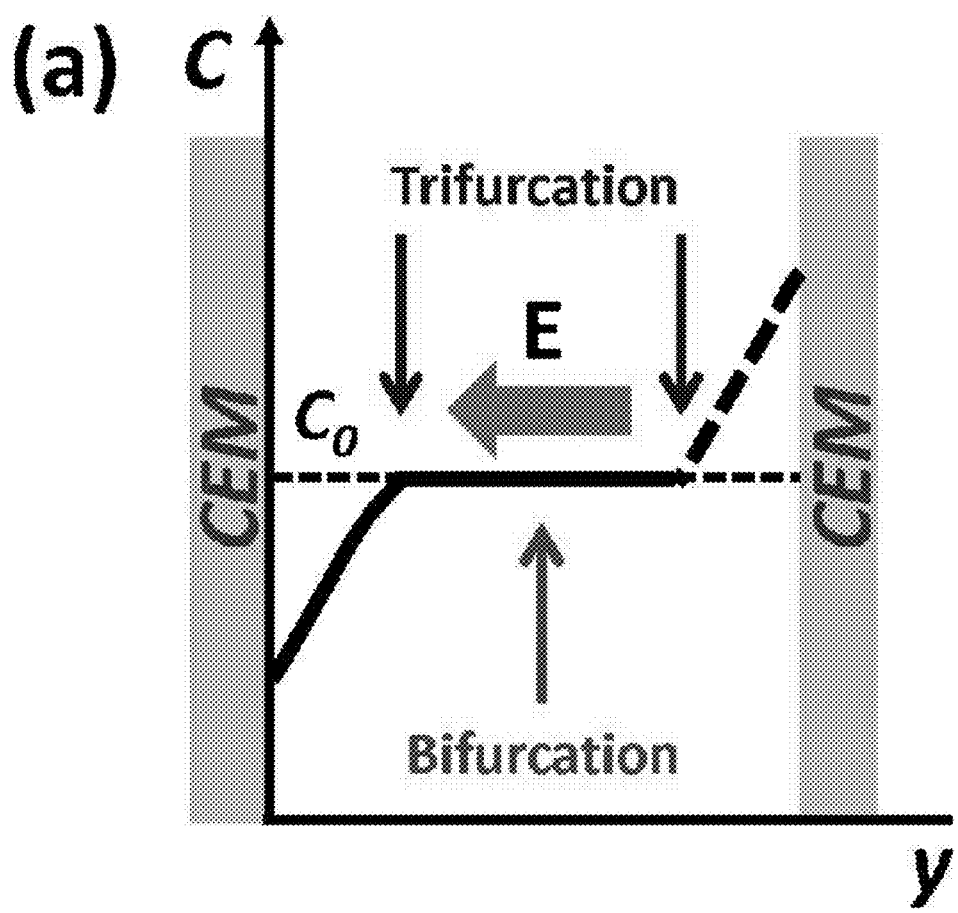
FIG. 6A-6B: Graph depiction of concentration distribution between identical CEMs; B) Graph depiction of Trend of Energy Per Ion (EPIR) removal based on feed concentration.
Figure 6B:
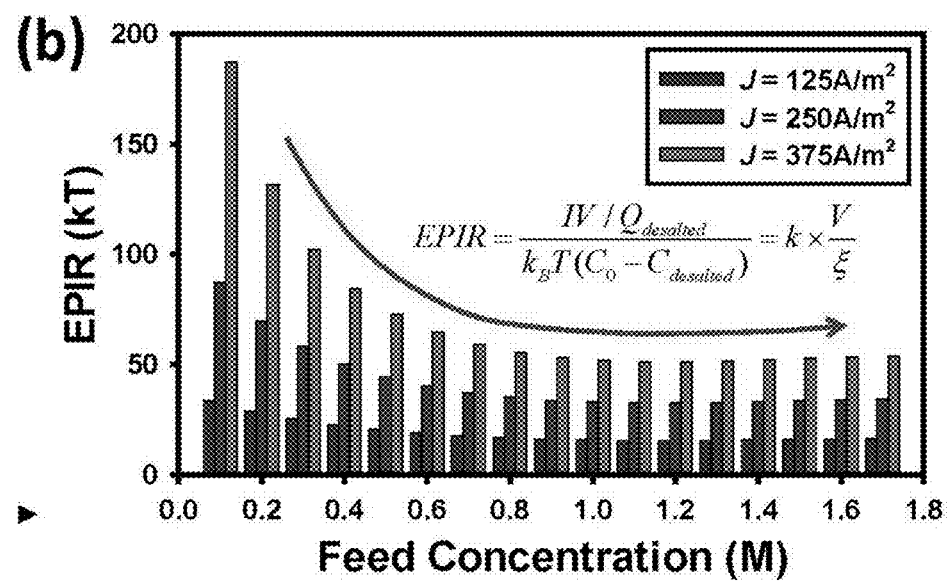
Figure 7A:
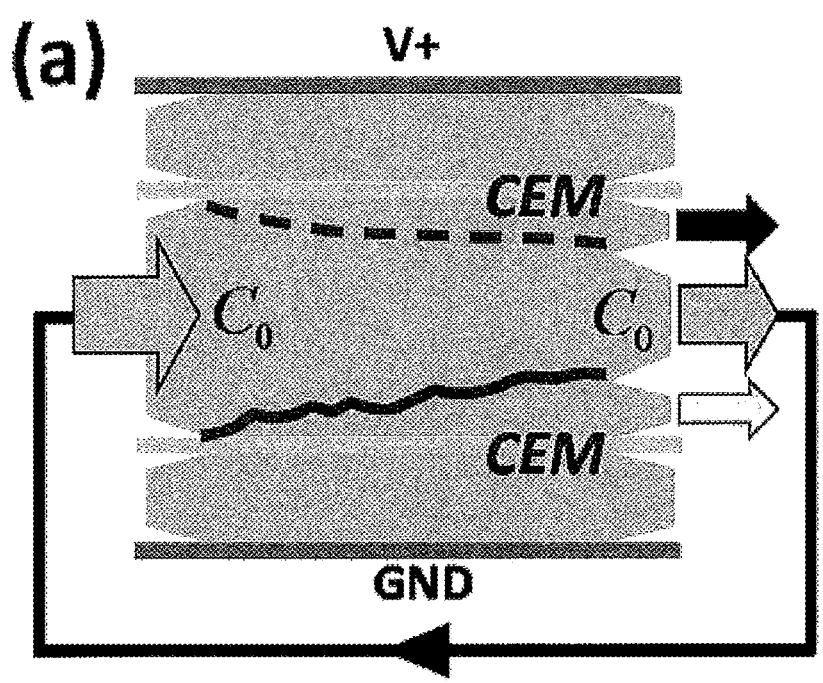
FIG. 7A-7C: Schematic of trifurcated ICP desalination for multi-stage embodiment; B) Fluorescent image of trifurcated ICP desalination; C) Graph depiction of real-time conductivity measurement of dilute, intermediate and concentrate output streams.
Figure 7B:
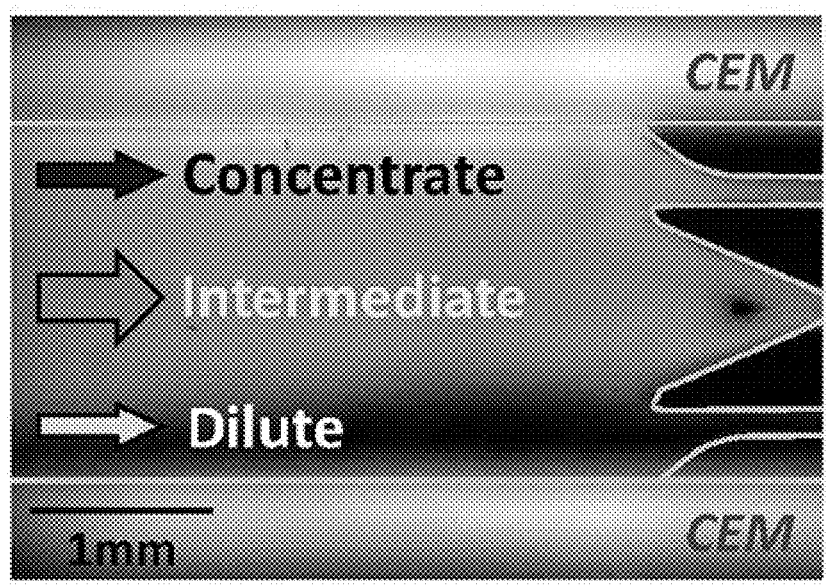
Figure 7C:
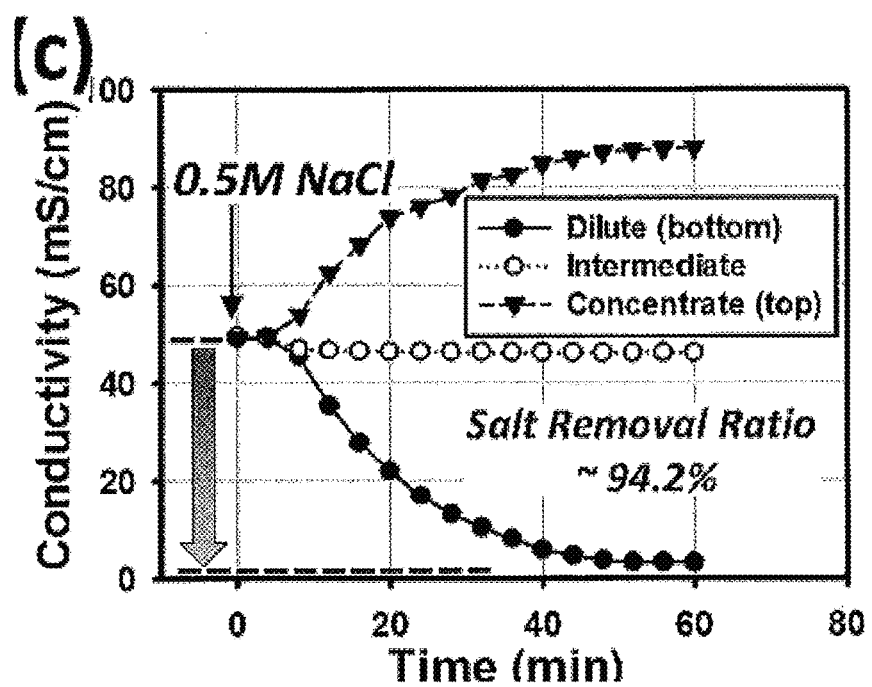

As shown in FIG. 6A, feed flow can be divided into three output streams (dilute, intermediate, concentrate) at the end of the membrane depending on the concentration distribution. FIG. 7A shows a schematic of trifurcated ICP strategy for multi-stage desalination. In every stage, each dilute (salt free) and concentrate (salt enhanced) stream is extracted before the next stage while the intermediate (no salinity change) stream could be fed again into the feed flow in the next stage. As mentioned above, the main purpose of extracting smaller dilute/concentrate streams with high/low purity and repeating the unit operation for certain quantities of salts is lowering the total energy input since high salt removal (recovery) in a single stage necessarily leads to a higher power consumption, as shown in FIG. 5B. In one embodiment of the trifurcated ICP, the feed concentration remains approximately constant in every stage. Since we already know that high feed concentration shows low EPIR (FIG. 6B), all stages may be run with low EPIR if the target water is highly brine. FIG. 7(B) and FIG. 7C respectively demonstrate trifurcated ICP operation and salt removal via measured conductivity change in each stream as a function of time using 0.5M NaCl (similar salinity with natural seawater).

Bifurcated ICP

In addition to trifurcated ICP, bifurcated ICP with two output streams (dilute, concentrate) also could be used for multi-stage desalination. Although the basic purpose of eliminating smaller amounts of salts in a single stage should be the same as trifurcated ICP, continuous change of feed concentration in each stage would be a prominent characteristic as compared with trifurcated ICP. Here, we suggest two different bifurcated ICP strategies dependent on the extracting stream.

Serial Extraction of Concentrate Stream

Figure 8A:
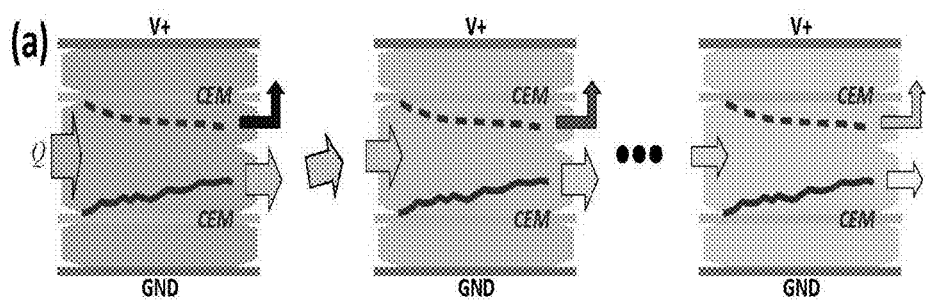
FIG. 8A-8B: Schematic of bifurcated ICP desalinization for multi-stage embodiment: A) Serial extraction of concentrate stream; B) Serial extraction of dilute stream.

FIG. 8A shows bifurcated ICP for multi stage operation by serial extraction of concentrate stream. One can extract small amount of concentrate stream and deliver large amount of dilute stream to the feed flow in next stage. After experiencing overall stages, dilute stream in the latest stage can be obtained as final desalted water, much dilute concentration than feed water. Since the feed concentration in next stage is going to be dilute, EPIR in the next stage can increase while acquiring final desalted water with high purity. In view of the energy efficiency to maintain low EPIR in most of stages, this strategy is appropriate for highly brine water (e.g., >1M NaCl) Another unique characteristic of this strategy is that overall recovery can be decreasing when each stage is added and thus more stages bring about higher water purity, at the cost of higher average EPIR and lower recovery.

Serial Extraction of Dilute Stream

Figure 8B:
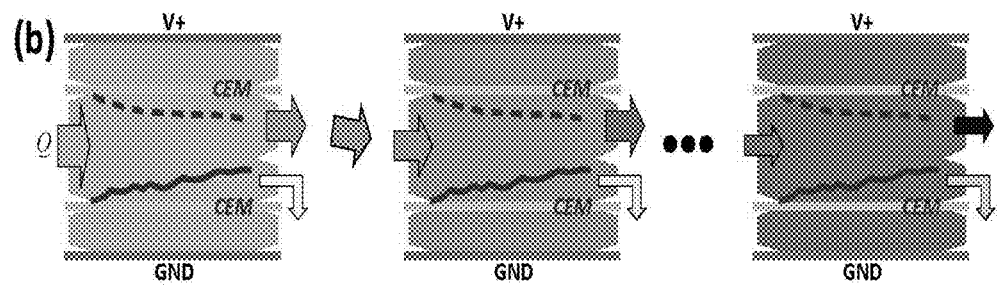

FIG. 8B shows bifurcated ICP for multi stage operation by serial extraction of a dilute stream. Opposite to the concept shown in FIG. 8A, one can extract a small amount of dilute stream and deliver large amount of concentrate stream to the feed flow in next stage. Dilute streams in every stage are final desalted water that we want to obtain and concentrate stream in the latest stage would be brine waste. Since the feed concentration in the next stage is going to be concentrated, the EPIR in that stage may decrease while it is difficult to acquire final desalted water with high purity. In view of the energy efficiency needs to lower EPIR in most of stages, this strategy is appropriate for brackish water. (e.g, <0.5M NaCl). Another unique characteristic of this strategy is that overall recovery would be increasing when stage is added and thus more stage bring about lower average EPIR and higher recovery, but lower water purity.

Hybrid Multi-Stack and Multi-Stage ICP Desalination

Figure 9:
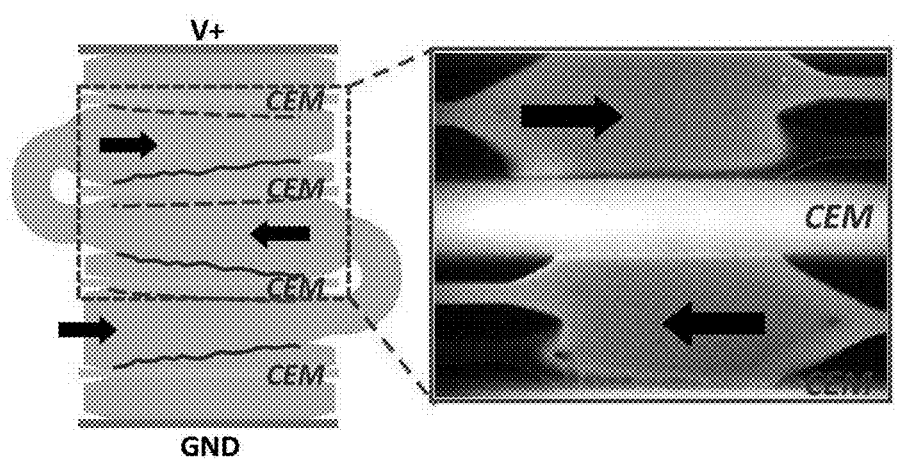
FIG. 9: Schematic and fluorescent image of hybrid multi-stack and multi-stage ICP desalination.

Since multi stack ICP involves multiple cells to be operated by common current flow between anode and cathode, it is possible to embed multi stage ICP units in single operation unit (single pair of anode and cathode) by connecting one of output channel to input channel in next stage placed above as shown in FIG. 9. Hybrid ICP desalination based on bifurcated ICP may be designed and operated for either serial extraction of concentrate or dilute stream.

Figure 1A:
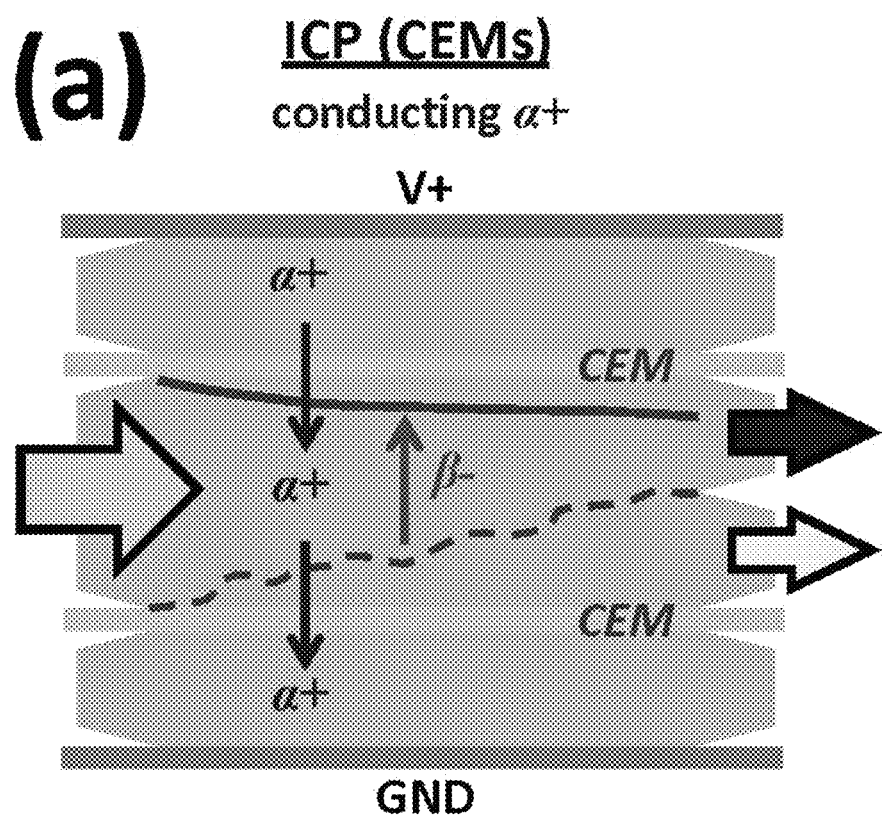
FIG. 1A-1C: Schematic of ICP desalination/purification using identical CEMs and bifurcated channel; B) Schematic of ICP desalination/purification using identical AEMs and bifurcated channel; C) Schematic of ED system with one CEM and one AEM.
Figure 1B:
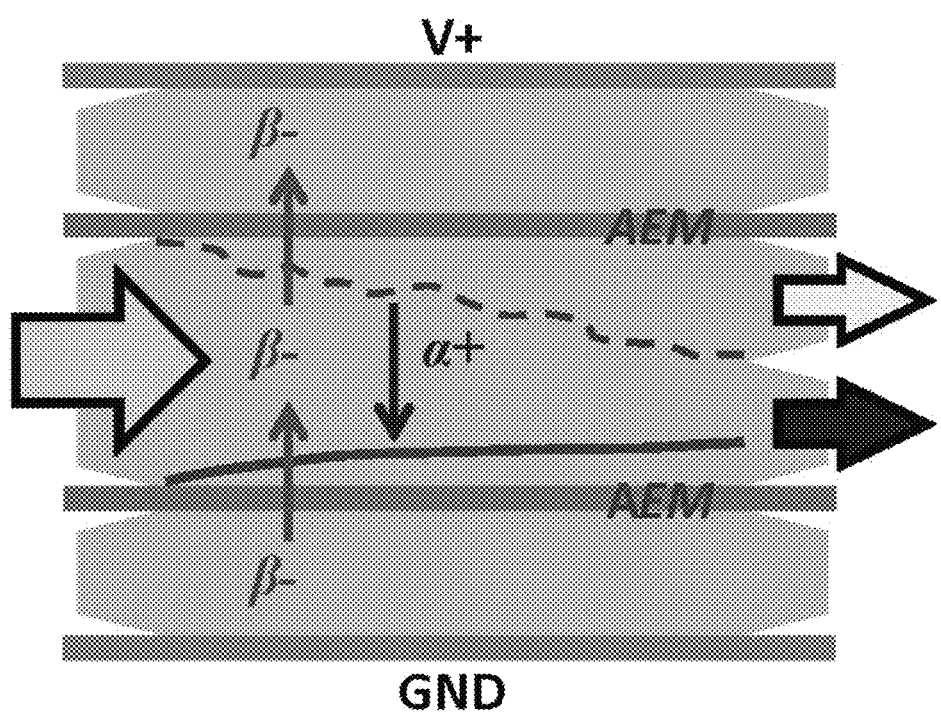
Figure 1C:
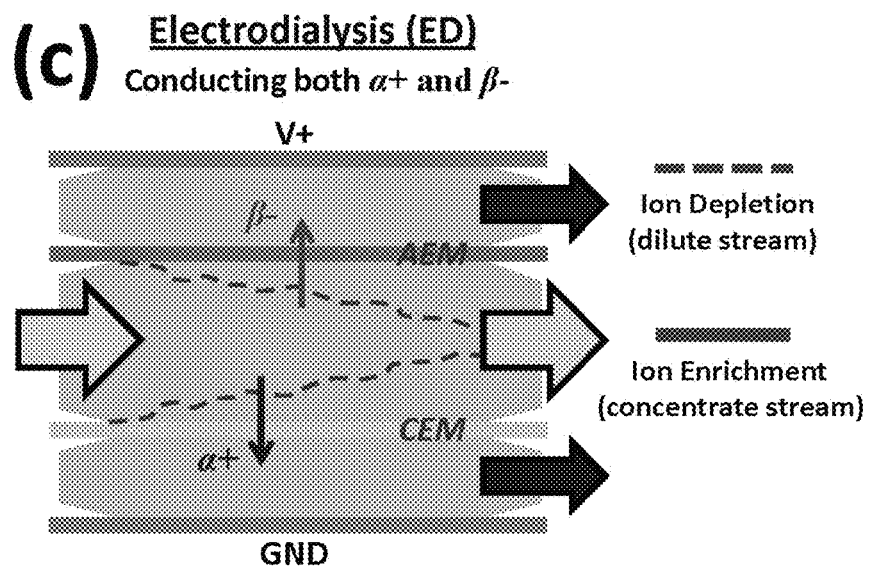

As shown in FIG. 7A and FIG. 7B and further detailed in FIG. 1, a preferred embodiment of the invention is a method of purifying and/or concentrating a first water stream containing ionic impurities comprising the following steps:

a. directing the first water stream in a channel comprising an inlet and an outlet and defined, at least in part by at least a first ion exchange membrane and at least a second ion exchange membrane, wherein the ion exchange membranes are juxtaposed and characterized by the same charge, b. applying an electric field across the channel causing formation of an ion depletion zone comprising a purified water stream, formation of an ion enrichment zone comprising a concentrated ion aqueous stream and formation of a neutral concentration zone comprising an intermediate stream;

c. trifurcating the channel in relation to the ion depletion zone, the ion enrichment zone and the neutral concentration zone of step (b) to cause separation of the purified water stream, the intermediate stream and the concentrated ion aqueous stream; and d. collecting a portion of the purified water stream and/or the intermediate stream and/or the concentrated ion aqueous stream.

In this preferred embodiment, the concentration of ionic impurities in the collected intermediate stream of step (d) is less than that found in the collected purified water stream and greater than that found in the collected concentrated ion aqueous stream, and the concentration of ionic impurities in the collected intermediate stream is substantially the same as the first water stream. The ion exchange membranes may be either CEM or AEM.

As cations are selectively transferred through the CEMs, for example, anions are relocated in order to achieve electroneutrality, resulting in the concentration drop (increase) in ion depletion (enrichment) zone. The concentration drop (or salt removal) is low and spatially gradual at relatively low voltage or current (e.g., Ohmic regime). However, at higher voltage or current (e.g., overlimiting regime), strong electroconvective vortex accelerates cation transport through CEMs, allowing us to "relocate" most salt ions. The flat depletion zone occurs with significantly low ion concentration, and corresponding strong electric field in the zone, and any charged agents (e.g. proteins and bacteria) cannot penetrate this flat zone. As a result, we can separate and collect the desalted/purified flow from brine flow by bifurcating the channel at the end of the CEMs. This ICP desalination/purification also happens with two anion exchange membranes (AEMs) by relocating cations, but the location of desalted/brine flows are converted. In one embodiment, the invention relates to a method of purifying water and/or concentrating materials in a water stream. In general, the method produces two or three streams, one which has reduced ionic species (purified water) and one that has concentrated ionic species (concentrated stream). Thus, the two terms, purifying and concentrating can be used interchangeably. The invention relates to a method of purifying and/or concentrating a first water stream containing ionic impurities comprising: directing the water stream in a channel comprising an inlet and an outlet and defined, at least in part, by two juxtaposed ion exchange membranes, wherein the ion exchange membranes are characterized by the same charge, applying an electric field across the water stream channel; whereby, an ion depletion zone ($d_{de}$) comprising a purified water stream and an ion enrichment zone ($d_{en}$) comprising a concentrated ion aqueous stream are generated and ions are transferred through the ion exchange membranes; and collecting the purified water stream and/or the concentrated ion aqueous stream. In addition, an intermediate stream is formed at the barrier of the two zones, which can be collected with or separately from the ion depletion zone or ion enrichment zone. In general, the channel formed by the two juxtaposed ion exchange membranes does not contain a membrane carrying a charge counter to the two juxtaposed ion exchange membranes. The consequence of the configuration is that only positive (or negative) ions, but not both participate in conduction. In other words, the ions in the electrolyte solution or aqueous stream to be purified that participate in the conduction in the apparatus, or cell, carry a common charge, while the counterions or ions carrying the opposite charge, while present, do not participate in conduction. Thus, the invention preferably excludes the use of an apparatus that traditionally functions via electrodialysis.

The ion exchange membranes are cationic or anionic exchange membranes. The two membranes can be the same or different. Strong anion or cation exchange membranes, as those products are generally sold in the art, are preferred. FUMASEP® FTAM-E and FTCM-E (FuMA-Tech CmbH, Germany) are suitable membranes. However, others can also be used. In particular, the term "ion exchange membrane" is intended to include not only porous, microporous or nanoporous films but also resins or materials through which ions can pass. Thus, in one embodiment, an ion exchange resin can be entrapped by one or more meshes (or porous membranes) in lieu of or in addition to one or more of the ion exchange membranes.

The ion exchange membranes can be placed into a support, such as glass, polydimethylsiloxane or other inert material. Thus, the support can also contribute to the formation of the channels.

At the outlet of the chamber, the streams in one or both zones can be collected. This can be conveniently accomplished by the bifurcation of the chamber at or near the outlet. In one embodiment, a nonionic membrane can be placed proximal to the boundaries of these zones to separate or bifurcate the zones and collect one or both streams.

As described herein, the inventors have characterized the fluid flow of the device using current-voltage responses categorized as Ohmic (1-2 V), limiting (2-2.5V) and overlimiting (>2.5 V) regimes. The electric field preferably creates a boundary layer comprising at least one electroconvective vortex proximal to at least one of the two juxtaposed ion exchange membranes.

The electric field is created by an electrode and a ground, each located external and parallel to the channel. In general, the electrode forms a second channel with the first of said two juxtaposed ion exchange membranes and the ground forms a third channel with the second of said two juxtaposed ion exchange membranes. These channels are generally filled with an electrolyte solution, which can conveniently be the water stream to be purified or concentrated.

One aspect of our invention combines the concepts of ICP and EC in one step. The device comprises an electrolytic cell with a cation exchange membrane (CEM) that separates the solutions in contact with anode and cathode respectively. Through this CEM, only cations can be transported according to the direction of the electric field applied. The anode is composed of a metal, typically aluminum or iron, and is used to provide metal ions for electrocoagulation.

Because our invention can remove both salt and nonionic particles, it is appropriate to discuss its advantage over other desalination and particle removal technologies. Many desalination systems require either a very high energy input (thermal evaporation technology) or complicated pre-treatment steps to remove potential foulants (membrane-based technology). For example, reverse osmosis (RO), the current leading technology for desalination, is a membrane-based technology, and its performance is largely dependent on membrane fouling. Proper functioning of RO requires pretreatment to remove potential foulants, such as suspended solids or bacteria. Another desalination technology is electrodialysis (ED). In ED, salt can be removed, and nonionic particles remain in the solution. In RO and ED, particle removal needs to be done prior to desalination. Our ICP-EC system does not require a separate pre-treatment device because the desalted zone near the membrane is free of salt or small particles. Our system is advantageous over other membrane-based desalination technologies in reducing membrane fouling.

Since our system can remove both salt and particles, it has the flexibility to treat various types of wastewater, whether it be brackish groundwater, household water rich in bacteria or other biological contaminants, or simply murky water from various suspended solids and/or industrial heavy metal contaminants.

In another preferred embodiment of the invention as described immediately above and detailed in FIG. 7(B), trifurcation of the outlet is accomplished by placement of at least one nonionic porous membrane at the outlet of the channel.

In yet another preferred embodiment and as shown in FIG. 7(A), the electric field is created by an electrode and a ground, each located external and parallel to the channel.

FIG. 7A shows aspects of another preferred embodiment wherein the electrode forms a second channel with the at least a first ion exchange membrane and the ground forms a third channel with the at least a second ion exchange membrane. The electrodes are operatively connected to a power source and, when powered, create a current across the membranes.

In still another preferred embodiment and as shown in FIG. 7A, the second and third channels are filled with an electrolyte solution. Optionally, the electrolyte solution may be the first water stream.

In a preferred embodiment, the first water stream may comprise salt.

In yet another preferred embodiment, the first water stream may comprise biomolecules. Biomolecules include cells (such as bacteria or animal), cellular fragments, particles (including viral particles), proteins, and nucleic acid molecules, for example.

In another preferred embodiment and as shown in FIG. 7A and FIG. 9, the steps of the previously described method are repeated and the intermediate stream collected in step d is used as the first water stream in subsequent repetitions of the method. Preferably, the membranes for one or more repetitions are stacked such that the channels formed thereby are parallel with each other and with the electrode and ground.

As shown in FIG. 9, another preferred embodiment has the electrical field of step b in the previously described method common to at least one repetition of the method. Where multiple implementations are "stacked", only one ground and one anode are necessary. Thus, the same electrical field is shared across the implementations. This also serves to decrease ground/anode size while simultaneously increasing active CEM/AEM size.

The salt removal ratio is a parameter to indicate the desalting ability of devices. By measuring the concentration (or conductivity) of sample flows $C_0$ and that of the desalted flow $C_{desalted}$, we can figure out how many salt ions are removed from the discrepancy between the two conductivities. Salt removal ratio is non-dimensional form of the amount of desalted ions by the initial ion concentration (or conductivity):

$$\text{Salt removal ratio} = \frac{C_0 - C_{desalted}}{C_0}. \quad (1.1)$$

The concentrations can be converted from the measured conductivity $\sigma$ in experiments with given molar conductivities of electrolytes. Here, we use only dilute binary electrolytes ($z^+=z^-=1$), 10 mM KCl, NaCl, and LiCl solutions. Then, the equation for conversion is:

$$C_i [\text{mol/m}^3 = \text{mM}] = \frac{\sigma}{\Lambda_{+,i} + \Lambda_{-,i}} \left[ \frac{S/m}{S \cdot m^2/mol} \right], \quad (1.2)$$

where $\Lambda_{+,i}$ and $\Lambda_{-,i}$ are the molar conductivity of cation and anion. The molar conductivities of Cl$^-$, K$^+$, Na$^+$, Li$^+$ are 7.63, 7.36, 5.01, and 3.87 [$10^3$ S m$^2$ mol$^{-1}$], respectively, which are connected closely with their diffusivity.

To compare different desalination devices, energy consumption is frequently measured. In electrochemical desalination systems, energy consumption for desalination is electrical power consumption (multiplication of current I and voltage V) divided by the flow rate of desalted water $Q_{desalted}$ per one cell:

$$\text{Energy consumption} = \frac{IV}{Q_{desalted}/N} [\text{Wh/L}]. \quad (1.3)$$

While energy consumption is an important metric determining the economic viability of the desalination technique, it cannot represent the desalination energy efficiency of the system. We therefore consider energy consumption to remove a single ion, i.e. energy per ion removal, which can be obtained by dividing energy consumption by the amount of removed ions and non-dimensionalizing by thermal energy $k_B T$ (=2.479 kJ/mol):

$$\text{Energy per ion removal} = \frac{NIV/Q_{desalted}}{k_B T (C_0 - C_{desalted})}. \quad (1.4)$$

Energy per ion removal is a parameter representing how efficiently energy is consumed to reject ions by combining the concept of energy consumption and salt removal ratio. However, it is noted that salt removal ratio or the value of conductivity drop can be checked together, because better energy per ion removal does not necessarily represent better desalting performance.

Current efficiency describes the ratio of rejected ions in desalted flow and ions transferred at the electrodes. The following equation is a modified to obtain current efficiency from the concentration differences of initial sample flow and desalted flow:

$$\text{current efficiency} = \frac{zFQ_{desalted}(C_0 - C_{desalted})}{NI}. \quad (1.5)$$

Last, area efficiency represents the amount of desalted ions per unit area of the working membranes or electrodes:

$$\text{Area efficiency} = \frac{C_0 - C_{desalted}}{A} [\text{mM/m}^2], \quad (1.6)$$

where A is the working area of IEMs here. The most significant cost of an electrochemical desalination system is the membrane cost, therefore higher area efficiency would be economically favorable. However, there is usually a trade-off between area efficiency and energy consumption; if one increases area efficiency to enhance salt removal ratio with a limited size device by applying higher electric potential, energy consumption will increase. If one uses a larger system for better salt rejection at a fixed voltage or current, area efficiency becomes lower.

The three platforms described here, ICP with two CEMs (2CEM) or AEMs (2AEM) and ED, are fabricated to study the differences and any potential advantages of each technique. The height h, width w, and length L of the working channel is 0.2, 2, and 10 mm, respectively. The area of working IEMs is therefore 2×10$^{-6}$ m$^2$. Three different electrolytes (10 mM KCl, NaCl, and LiCl) with 10 mM concentration are used to observe the effect of asymmetric molar conductivity (or diffusivity) of cation and anion. The flow rate between IEMs is 20 µL/min, so the desalted flow rates $Q_{desalted}$ are 10 µL/min for ICP platform and 20 µL/min for ED. The electrodes are rinsed with the same electrolytes (KCl or NaCl or LiCl) with 30 µL/min; dibasic buffer solution is not used here to supply the same cations or anions within the sample water.

We measured current responses on applied voltage from 0 to 10 V to overview the ICP and ED systems' characteristics. As described in U.S. Ser. No. 14/857,133, which is incorporated herein by reference, the transition from Ohmic to overlimiting regimes are observed with the slope changes near 2V. Interestingly, the current-voltage curves of ED and ICP platform with two CEMs are almost same, but the curves of ICP platform with two AEMs are located above even with the same electrolytes. This indicates two major characteristics of the ICP and ED platforms; the current responses are governed i) by the conducting ions (cations in 2CEM and anions in 2AEM) or ii) by the slower ions (cations in ED). The movement of Cl$^-$ governs ICP platform with two AEMs with KCl, NaCl, and LiCl solutions. The movement of cation governs ICP platform with two CEMs and ED, because chorine ion has a higher molar conductivity than cations here. If we place ions in the order of higher molar conductivity (proportional to electrophoretic mobility or diffusivity), it is Cl$^-$>K$^+$>Na$^+$>Li$^+$. Accordingly, in ICP with 2CEM and ED, the current values with K$^+$ are higher than that with Na$^+$ and Li$^+$.

The phenomena by previous linear ICP analysis is that a limiting current density (LCD) is linearly proportional to the diffusivity (or molar conductivity) of conducting ions. Here, the limiting current can be selected at the location where the current-voltage curve is bent.

For quantifying desalting performances of two types of ICP platform and ED, we record voltage responses, conductivity drop of desalted flows, and visualized ion concentration/flow profiles with fluorescent dyes during 300 sec at a constant applied current (Ohmic regime: 5, 10 μA and overlimiting regime: 20, 30, 50, 75, 100, 150, 200 μA) and a given flow rates (20 μL/min) of various aqueous solutions with 10 mM KCl, NaCl, and LiCl. Based on the given, controlled, and measured parameters, we also obtain salt removal ratio, energy consumption, energy per ion removal, current efficiency, and area efficiency for all data points. As can be seen, most parameters have similar values in Ohmic regime (5 and 10 μA) with lower current and voltage (<2 V), but there are clear differences in overlimiting regime. This extensive dataset of three different systems with three different electrolytes reveals many interesting trends and elucidates the differences between ICP platform and ED with nonlinear ICP.

First, the voltage-current responses show the similar tendencies. Correspondingly, the energy consumptions of ED and ICP with 2CEM are matched when the same electrolyte is used. In the case of ICP with 2AEM, chlorine ions can move faster with higher molar conductivity, resulting in lower cell resistance, lower voltage responses at a given current, and lower energy consumptions than the other two systems.

However, salt removal ratio of ICP with 2AEM are worse than both ICP with 2CEM and ED; ICP with 2CEM shows larger salt removal ratio than ED, meaning that with the same amount of driving current, ICP (2CEM) can move more ions from the desalted flow output. It is noted that with faster cation ($K^+>Na^+>Li^+$), the salt removal ratio is constant (ED) or higher (ICP with 2CEM) or lower (ICP with 2AEM). This ambitendency of the salt removal ratio at a constant applied current is also shown in the current efficiency. The current efficiency of ICP with 2CEM (2AEM) always better (worse) than ED, and the trend is magnified the cation molar conductivity is lower. This phenomenon will be discussed in detail in the next section.

Energy per ion removal represents the combined efficiency of both energy consumption and salt removal. Energy per ion removal of ICP with 2AEM have the lowest values, as like energy consumption. However, energy per ion removal of ICP with 2CEM becomes better than that of ED. It is because of higher salt removal ratio of ICP with 2CEM and that of ED, even the energy consumption are the same. In all three systems, removing slow ions ($Li^+$) require more energy than the other faster ions $K^+$ and $Na^+$). Energy per ion removal in overlimiting regime is $O(10^3 k_BT)$, but it becomes $O(10 k_BT)$ in Ohmic regime, which is comparable with state-of-the-art CDI systems. While the operation in Ohmic regime (applied current <20 μA) shows better energy efficiency (i.e., energy per ion removal), the area efficiency is significantly low. This enlightens us about the trade-off in optimization of desalting processes; better energy per ion removal and worse area efficiency (e.g., CDI or Ohmic ED), or higher salt removal ratio and area efficiency but worse energy per ion removal (e.g., nonlinear ED or ICP). The former is ideal for achieving the maximum energy efficiency, but challenging to deal with large amount of salts (high salinity feed water). The latter can handle high salinity feed water (due to high salt removal ratio) and the system size can be minimized, at the cost of higher energy expense per ions removed.

As discussed above, current voltage responses in ICP and ED platforms with various salts can be largely expected from the linear and nonlinear ICP model from the previous chapters. However, the trend of the salt removal ratio is exponible for deeper understanding of ion transport in ICP desalination process, along with energy per ion removal and current efficiency.

In one embodiment, an ion exchange resin, (e.g., in a bead form), can be added to the channel, (e.g., in the path of the desalted flow stream). In a continuous electrodeionization (CEDI) process, IERs can enhance ion transfer toward the IEMs, particularly where the IER is more conductive than the electrolyte or aqueous stream to be purified. In addition, generation of hydrogen ($H^+$) and hydroxide ($OH^-$) ions by water splitting help IER's regeneration (i.e. the procedure for recovering the ion exchange capacity of IER), so CEDI can remove even weakly ionized species such as carbonic acid; this phenomenon is called electroregeneration. Enhanced ion transfer and electroregeneration by IER allows CEDI to produce ultrapure water.

The method of the invention can be used to detect molecules. Microfluidic devices for molecular detection have been extensively pursued, due to many well-documented advantages of such systems; rapid analyses, less consumption of samples and reagents, and potential for massive parallelization and automation. However, efficient world-to-chip interfacing, sample preparation and concentration of low-abundance analytes remain as challenges, especially for non-nucleotide targets. To achieve more sensitive detection for any given sensor platform, various sample preconcentration approaches have been developed, including isotachophoresis, electrokinetic trapping, membrane filtration, and ion concentration polarization. These methods could potentially enhance the sensitivity of biological assays such as immunoassays and enzyme activity assays. So far, most existing biomolecule concentration devices operate by collecting or trapping low-abundance biomolecules within a small volume sample plug. While this mode of concentration is efficient in increasing the local concentration, it is often limited in maximum flow rate/sample volume one can process, and the integration with downstream detection steps is commonly challenging. One could avoid these problems by carrying out the detection within the plug during the ongoing concentration process, but different electric/fluidic/pH/other conditions within (or near) the concentrated plug could render such in situ detection less desirable. Otherwise, cells could be concentrated by inertia force-based microfluidic device, but they are not suitable for biomolecule concentrator because the size of molecules is too small to expect inertial effect.

The following references are incorporated herein by reference in their entirety.

REFERENCES

[1] R. Kwak, and J. Han, "Novel Water Desalination/ Purification and Bio-agent Preconcentration Technology by Ion Concentration Polarization", filed Jun. 17,k 2014, U.S. application Ser. No. 14/306,607, *MIT Technology Disclosure*, and U.S. application Ser. No. 14/857,133, filed Sep. 17, 2015, by Choi and Han.

[2] R. Kwak, V. S. Pharn, B. Kim, L. Chen and J. Han, "High Throughput Salt I Bio-Agent Removal by Ion Concentration Polarization for Water Desalination, Purification, and Monitoring", *International Conference on Miniaturized Systems for Chemistry and Life Sciences (MicroTAS)*, Freiburg, Germany, October 2013.

[3] A. A. Soni, A. K. Balasubramanian, A. Beskok, S. D. Pillai, "Zeta Potential of Selected Bacteria in Drinking Water When Dead, Starved, or Exposed to Minimal and Rich Culture Media", *Current Microbiology*, 56, pp. 93-97, 2008.
[4] F. Valero, A. Barcelo, and R. Arbos, "Electrodialysis Technology, Theory and Applications", *Desalination, Trend and Technology*, 2010.
[5] M. Elimelech, and W. A. Phillip, "The Future of Seawater Desalination: Energy, Technology, and the Environment", *Science*, 333, pp. 712-717, 2011.
[6] H. J. Lee, F. Sarfert, H. Strathmann, S. H. Moon, "Designing of an Electrodialysis Desalination Plant", *Desalination*, 142, pp. 267-286, 2002.
[7] E. M. van der Ent, P. van Hee, J. T. G. Keurentjes, K. van't Riet, and A. van der Padt, "Multistage Electrodialysis for Large-Scale Separation of Racemic Mixtures", *Journal of Membrane Science*, 204, pp. 173-184, 2002.
[8] K. V. Gregory, R. D. Vldic, and D. A. Dzombak, "Water Management Challenges Associated with the Production of Shale Gas by Hydraulic Fracturing", *Elements*, 1, pp. 181-186, 2011.
[9] E. Hastuti, and M. W. Wardiha, "A Study of Brackish Water Membrane with Ultrafiltration Pretreatment in Indonesia's Coastal Area", *Journal of Urban and Environmental Engineering*, 6. pp. 10-17, 2012.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of purifying and/or concentrating a first water stream containing ionic impurities comprising the steps:
    a. directing the water stream in a channel comprising an inlet and an outlet and defined, at least in part by at least a first ion exchange membrane and at least a second ion exchange membrane, wherein the ion exchange membranes are juxtaposed and characterized by a functional group having the same polarity;
    b. applying an electric field across the channel causing formation of an ion depletion zone comprising a purified water stream, formation of an ion enrichment zone comprising a concentrated ion aqueous stream and formation of a neutral concentration zone comprising an intermediate stream, wherein the electric field is created by an electrode and a ground each located external and parallel to the channel and the electrode forms a second channel with the at least a first ion exchange membrane and the ground forms a third channel with the at least a second ion exchange membrane;
    c. trifurcating the channel in relation to the ion depletion zone, the ion enrichment zone and the neutral concentration zone of step b to cause separation of the purified water stream, the intermediate stream and the concentrated ion aqueous stream;
    d. collecting any portion of the purified water stream and/or the intermediate stream and/or the concentrated ion aqueous stream; and
    wherein the concentration of ionic impurities in the collected intermediate stream is greater than that found in the collected purified water stream and less than that found in the collected concentrated ion aqueous stream, and the concentration of ionic impurities in the collected intermediate stream is substantially the same as the first water stream.

2. The method of claim 1, wherein the at least a first and at least a second juxtaposed ion exchange membrane are cationic exchange membranes.

3. The method of claim 1, wherein the at least a first and at least a second juxtaposed ion exchange membrane are anionic exchange membranes.

4. The method of claim 1, wherein the second and third channel are filled with an electrolyte solution.

5. The method of claim 4, wherein the electrolyte solution is the first water stream.

6. The method of claim 1, wherein the first water stream comprises salt.

7. The method of claim 1, wherein the first water stream comprises biomolecules.

8. The method of claim 1, wherein steps a through d are repeated and wherein the intermediate stream collected in step d acts as the first water stream in subsequent repetitions of the method.

9. The method of claim 7, wherein the electrical field of step b is common to at least one repetition of the method.

10. The method of claim 1, wherein steps a through d are repeated and wherein the intermediate stream collected in step d acts as the first water stream in a subsequent repetition of the method in a serially arranged, stacked channel.

11. The method of claim 10, wherein the electrical field of step b is common to each serially arranged channel and wherein the electric field is created by an electrode and a ground each located external and parallel to each stacked channel.

* * * * *